US007010922B2

(12) United States Patent
Takai et al.

(10) Patent No.: US 7,010,922 B2
(45) Date of Patent: Mar. 14, 2006

(54) SINGLE SHAFT COMBINED CYCLE POWER PLANT AND ITS OPERATION METHOD

(75) Inventors: Hidekazu Takai, Hitachi (JP); Ryouichi Ohkura, Takahagi (JP)

(73) Assignee: Hitachi, Ltd., Tokyo (JP)

( * ) Notice: Subject to any disclaimer, the term of this patent is extended or adjusted under 35 U.S.C. 154(b) by 5 days.

(21) Appl. No.: 10/900,461

(22) Filed: Jul. 28, 2004

(65) Prior Publication Data

US 2005/0022497 A1  Feb. 3, 2005

(30) Foreign Application Priority Data

Aug. 1, 2003  (JP) .............................. 2003-205322

(51) Int. Cl.
*F02C 6/04* (2006.01)
(52) U.S. Cl. ..................................... 60/773; 60/39.182
(58) Field of Classification Search ................. 60/773, 60/39.182

See application file for complete search history.

(56) References Cited

U.S. PATENT DOCUMENTS 5,099,643 A  3/1992  Moore

| | | | |
|---|---|---|---|
| 6,851,266 B1 * | 2/2005 | Liebig | 60/772 |
| 2004/0011040 A1 * | 1/2004 | Tanaka et al. | 60/698 |
| 2004/0045299 A1 * | 3/2004 | Blatter et al. | 60/772 |
| 2004/0055272 A1 | 3/2004 | Tanaka | |

FOREIGN PATENT DOCUMENTS

| | | |
|---|---|---|
| DE | 44 26 354 | 2/1996 |
| EP | 03070804 | 3/1991 |
| JP | 8-177414 | 7/1996 |
| WO | WO 03/002883 | 1/2003 |

* cited by examiner

*Primary Examiner*—Ehud Gartenberg
(74) *Attorney, Agent, or Firm*—Dickstein Shapiro Morin & Oshinsky LLP

(57) ABSTRACT

According to the invention, there is provided a single shaft combined cycle power plant which can quickly switch from single operation of a gas turbine to combined operation of the gas turbine and a steam turbine, and can quickly increase output power, from low power to high power. The single shaft combined cycle power plant includes a means for maintaining the rotation speed of the steam turbine at a speed slower than but near a rated rotation speed when the steam turbine is separated from a coupled unit of a generator and the gas turbine.

5 Claims, 3 Drawing Sheets

SINGLE SHAFT COMBINED CYCLE POWER PLANT AND ITS OPERATION METHOD

BACKGROUND OF THE INVENTION

1. Field of the Invention

The present invention relates to a single shaft combined cycle power plant which drives a generator by a gas turbine and a steam turbine, and more particularly to a single shaft combined cycle power plant which is configured so that a steam turbine can be separated from and connected to a coupled unit of a generator and a gas turbine.

2. Description of the Prior Art

A single shaft combined cycle power plant configured so that a steam turbine can be separated from and connected to a coupled unit of a generator and a gas turbine has been proposed in JP-A-8-177414 (see FIGS. 4 and 5, and Paragraphs 0016, and 0028 to 0031).

BRIEF SUMMARY OF THE INVENTION

In the above described conventional single shaft combined cycle power plant, it is possible to perform single operation of the steam turbine, and of the gas turbine. However, when solely operating one of the steam turbine and the gas turbine, the other is stopped from running, so that it takes a long time to synchronize the steam turbine and the gas turbine for switching from the single operation to combined operation of the gas turbine and the steam turbine.

Accordingly, it is an object of the invention to provide a single shaft combined cycle power plant which can quickly switch from single operation of a gas turbine to combined operation of the gas turbine and a steam turbine.

Another object of the invention is to provide a single shaft combined cycle power plant which can quickly increase output power of a generator, from low power to high power.

In order to achieve the objects, the present invention provides a single shaft combined cycle power plant including a means for maintaining the rotation speed of a steam turbine at a predetermined speed slower than a rated rotation speed (for example, at a speed near the rated rotation speed) when the steam turbine is separated from a coupled unit of a generator and a gas turbine.

According to the above described configuration, because the rotation speed of the steam turbine separated from the coupled unit of the generator and the gas turbine is maintained at the speed slower than and near the rated rotation speed, when connecting the steam turbine to the coupled unit of the generator and the gas turbine, the rotation speed of the steam turbine can be quickly increased to the rated rotation speed, whereby it becomes possible to quickly switch from single operation of the gas turbine to combined operation of the gas turbine and the steam turbine. Thus, it is possible to quickly increase output power of the generator, from low power to high power.

Other objects, features, and advantages of the invention will become apparent from the following description of embodiments of the invention taken in conjunction with the accompanying drawings.

Hereinafter, the embodiments of the invention will be described with reference to the drawings.

DETAILED DESCRIPTION OF THE INVENTION

Figure 1:
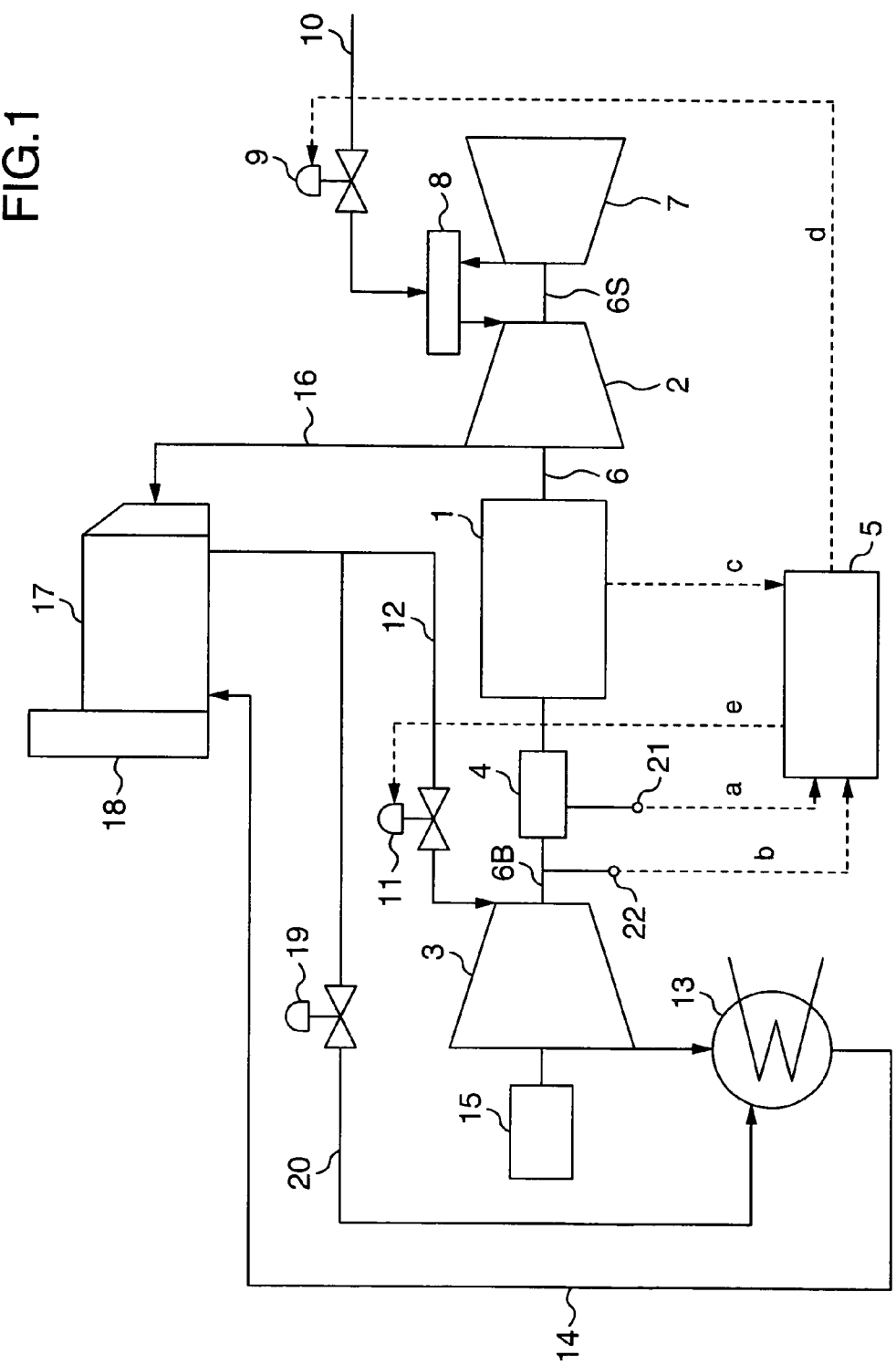
FIG. 1 is a schematic view of a first embodiment of a single shaft combined cycle power plant according to the invention.

A first embodiment of a single shaft combined cycle power plant according to the invention will be described below with reference to FIGS. 1 and 2.

The single shaft combined cycle power plant according to the embodiment mainly includes a generator 1, a gas turbine 2 and a steam turbine 3 which drive the generator 1, a clutch 4 which is a means for separating and connecting the steam turbine 3 from and to the generator 1, and a control device 5 which detects output change (load change) of the generator 1 to output an instruction to separate and connect the steam turbine 3 from and to the generator 1.

The generator 1 shares a rotation axis 6 with the gas turbine 2, or is connected to a rotation axis 6S of the gas turbine 2.

The gas turbine 2 includes an air compressor 7 which shares the rotation axis 6S with the gas turbine 2, a combustor 8 which introduces compressed air from the air compressor 7, and a fuel supply system 10 having a fuel adjusting valve (or a control valve) which supplies fuel to the combustor 8.

The steam turbine 3 includes a steam supply system 12 having a steam regulating valve 11, a condensed water recovery system 14 which recovers used steam by condensing it using a condenser 13, and a turning device 15 connected to the steam turbine 3.

The clutch 4 separates and connects the rotation axis 6 of the generator 1 from and to the rotation axis 6B of the steam turbine 3, and is a so-called one-way clutch which separates the rotation axis 6 from the rotation axis 6B when the rotation speed of the steam turbine 3 is less than that of the generator 1, and connects the separated rotation axis 6 to the rotation axis 6B when the rotation speed of the steam turbine 3 reaches or becomes faster than that of the generator 1.

The gas turbine 2 includes an exhaust gas system 16 for discharging exhaust gas which is combustion gas supplied from the combustor 8, and the exhaust gas is discharged via a heat recovery steam generator 17 from a chimney 18.

On the other hand, the condensed water in the condensed water recovery system 14 is guided to the heat recovery steam generator 17, heated into hot steam, and then guided to the steam supply system 12.

Further, a steam recovery system 20 including, for example, a control valve 19 which opens when starting and stopping the steam turbine, and in an emergency, is guided from the steam supply system 12 before the steam regulating valve 11 to the condenser 13, so as to bypass the steam turbine 3.

The control device 5 captures a detection signal "a" of a clutch connection detector 21 which is a means for detecting a separation or connection state of the clutch 4, a detection signal "b" from a rotation speed detector 22 which is a means for detecting the rotation speed of the rotation axis 6B of the steam turbine 3, and an output signal "c" of the generator 1. Then, based on the signals from "a" to "c", a control signal "d" for controlling the fuel adjusting valve 9 and a control signal "e" for controlling the steam regulating valve 11 are output.

In the case of the single shaft combined cycle power plant having the above described clutch 4, at the time of starting, the gas turbine 2 is activated while the steam turbine 3 is separated from the generator 1, and when the rotation speed is reached to a suitable speed for ignition of the combustor 8, the fuel adjusting valve 9 is opened according to an instruction from the control device 5 so as to supply fuel to the combustor 8. The supplied fuel is mixed with air supplied from the air compressor 7 to be air-fuel mixture, and the air-fuel mixture is burned to generate combustion gas. The combustion gas rotates the gas turbine 2, and the rotation speed thereof is increased to the rated rotation speed. The combustion gas used in the gas turbine 2 is introduced into the heat recovery steam generator 17 as exhaust gas, and then the condensed water from the condenser 13 is heated to generate steam. The steam is supplied from the steam supply system 12 to the steam turbine 3 to generate torque in the steam turbine 3. The steam used in the steam turbine 3 is condensed by the condenser 13 and returned to the heat recovery steam generator 17. After the rotation speed of the steam turbine 3 increases to the rated rotation speed, the steam turbine 3 is connected via the clutch 4 to the gas turbine 2 of which the rotation speed has already reached the rated rotation speed.

By the above described series of controls, both the gas turbine 2 and the steam turbine 3 reach the rated rotation speed, so that rated power is output from the generator 1.

In the case that the need for reducing the output of the generator 1 arises if load change occurs during the above described operation, for example, if a load connected to the generator 1 decreases, it is thought that the output of both the gas turbine 2 and the steam turbine 3 should be reduced. However, in accordance with a recent emission regulation of environmental pollutants, for example, nitrogen oxides (hereinafter referred to as NOx), the gas turbine adopts a low-NOx combustor and thus, the output of the gas turbine cannot be easily reduced together with the steam turbine. That is, in order to minimize the amount of NOx emission, misfire, and backfire of the low-NOx combustor, the output of the gas turbine must be maintained, for example, at 75% output at the lowest.

Figure 2:
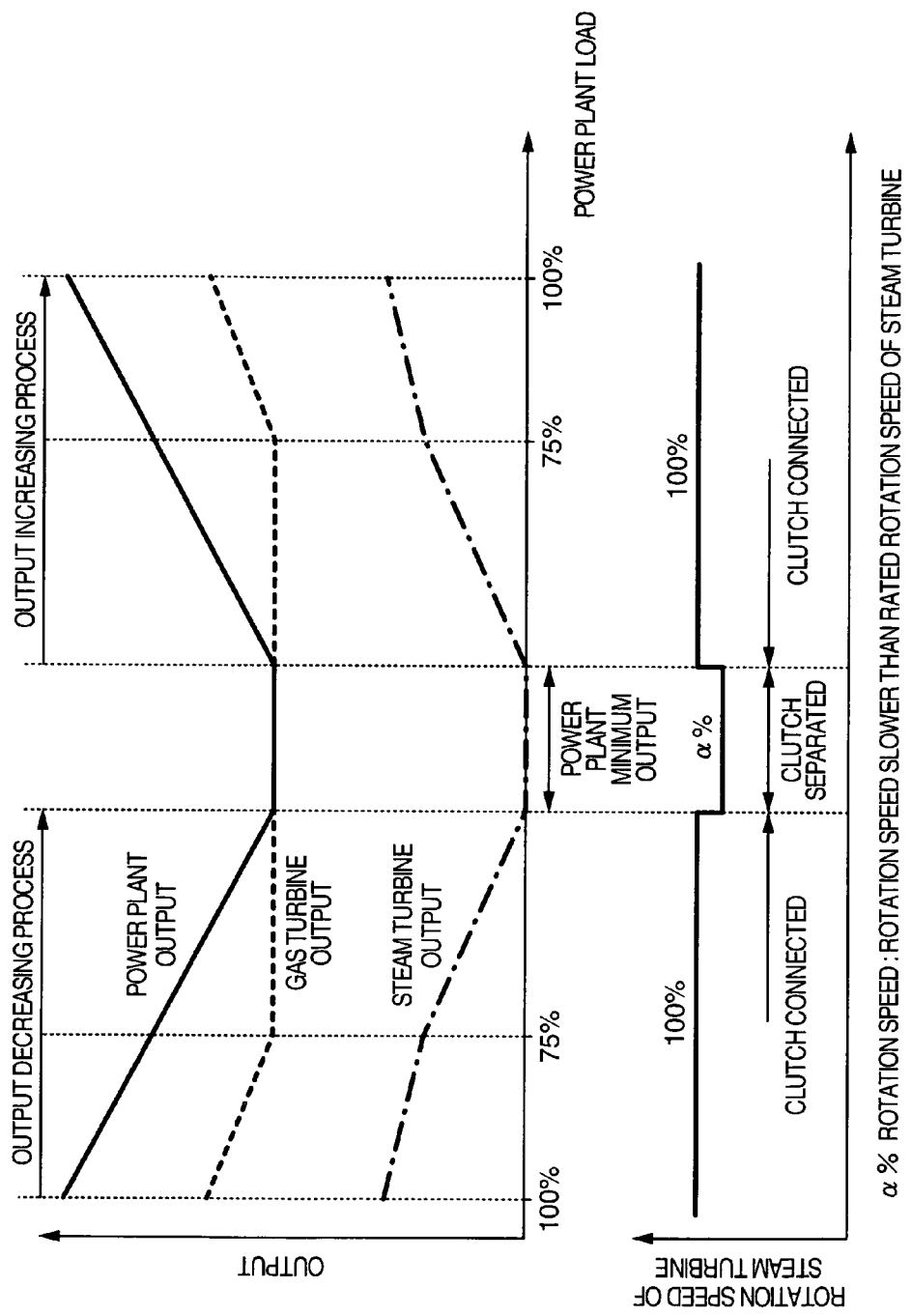
FIG. 2 illustrates a relationship between the power plant output and the rotation speed of a steam turbine of the single shaft combined cycle power plant as shown in FIG. 1.

For this purpose, in the present embodiment, as shown in FIG. 2, the output of the generator 1 becomes lowest when the gas turbine 2 is singly operated. Further, when the steam turbine 3 is separated from the generator 1, in other words, when the control device 5 receives the detection signal "a", which indicates the separation of the steam turbine 3, from the clutch connection detector 21 which is the detection means, the detection signal "b" from the rotation speed detector 22 which is the detection means is captured to generate the control signal "e" to control the opening degree of the steam regulating valve 11 so as to maintain the rotation speed of the steam turbine 3 at a speed slower than the rated rotation speed (for example, 3000 rpm) and near the rated rotation speed (for example, 97% of 3000 rpm).

When the rotation speed of the steam turbine 3 is maintained at 97% of the rated rotation speed, the clutch 4 remains separated, and thus the steam turbine 3 remains separated from the generator 1 connected to the gas turbine 2.

When the control device 5 controls the opening degree of the steam regulating valve 11 so as to maintain the rotation speed of the steam turbine 3 at 97% of the rated rotation speed, excessive steam resulting from limitation by the steam regulating valve 11 is recovered into the condenser 13 via the control valve 19 and the steam recovery system 20.

Thus, in this embodiment, the clutch connection detector 21, the rotation speed detector 22, the control device 5, and the steam regulating valve 11 operate as a means for maintaining the rotation speed of the steam turbine 3 at the speed slower than but near the rated rotation speed.

In this way, the generator 1 can be driven solely by the gas turbine 2. In this situation, if the control device 5 detects increase in load by the output signal "c" of the generator 1, the control device 5 sends the control signal "e" to open the steam regulating valve 11 to increase the amount of steam supplied to the steam turbine 3, so as to increase the rotation speed of the steam turbine 3 up to the rated rotation speed. When the rotation speed of the steam turbine 3 is increased to the rated rotation speed, the clutch 4 is then connected to cause combined operation by the gas turbine 2 and the steam turbine 3. In this switching from the single operation of the gas turbine 2 to the combined operation of the gas turbine 2 and the steam turbine 3, the rotation speed of the steam turbine 3 can be increased to the rated rotation speed in a short time because the steam turbine 3 is in a standby state with the rotation speed being maintained at 97% of the rated rotation speed, whereby the combined operation can be recovered in a short time.

The above described switching between the combined operation and the single operation (namely, a load change occurs in a short time, and the necessity of addressing a load change in a short time) occurs during the day in the case of a power plant for selling electricity or a house power plant for complying with electric power demand in a factory, for example, while no frequent load change occurs during the night.

Accordingly, when the operation shifts from the daytime operation with load change in a short time to the nighttime operation with no load change and with the load being reduced, the rotation of the steam turbine 3 is stopped in a state of the steam turbine 3 being separated from the generator 1 and the gas turbine 2, or the gas turbine 2 is solely operated while the steam turbine 3 is rotated at a low speed of 10 rpm, for example, by the turning device 15.

Then, when a time zone in which the load changes in a short time comes on the following day, steam is supplied to the steam turbine 3 to maintain the rotation speed of the steam turbine 3 at the speed slower than the rated rotation speed but near the rated rotation speed (97% of the rated rotation speed) and bring the steam turbine 3 in a standby state, while continuing the single operation of the gas turbine 2.

During the standby state, when the time zone in which the load changes in a short time comes and the load is increased, the amount of steam supplied to the steam turbine 3 is increased to increase the rotation speed of the steam turbine 3 up to the rated rotation speed, and then the steam turbine 3 is connected to the generator 1 connected to the gas turbine 2 to perform the combined operation, as described above.

Figure 3:
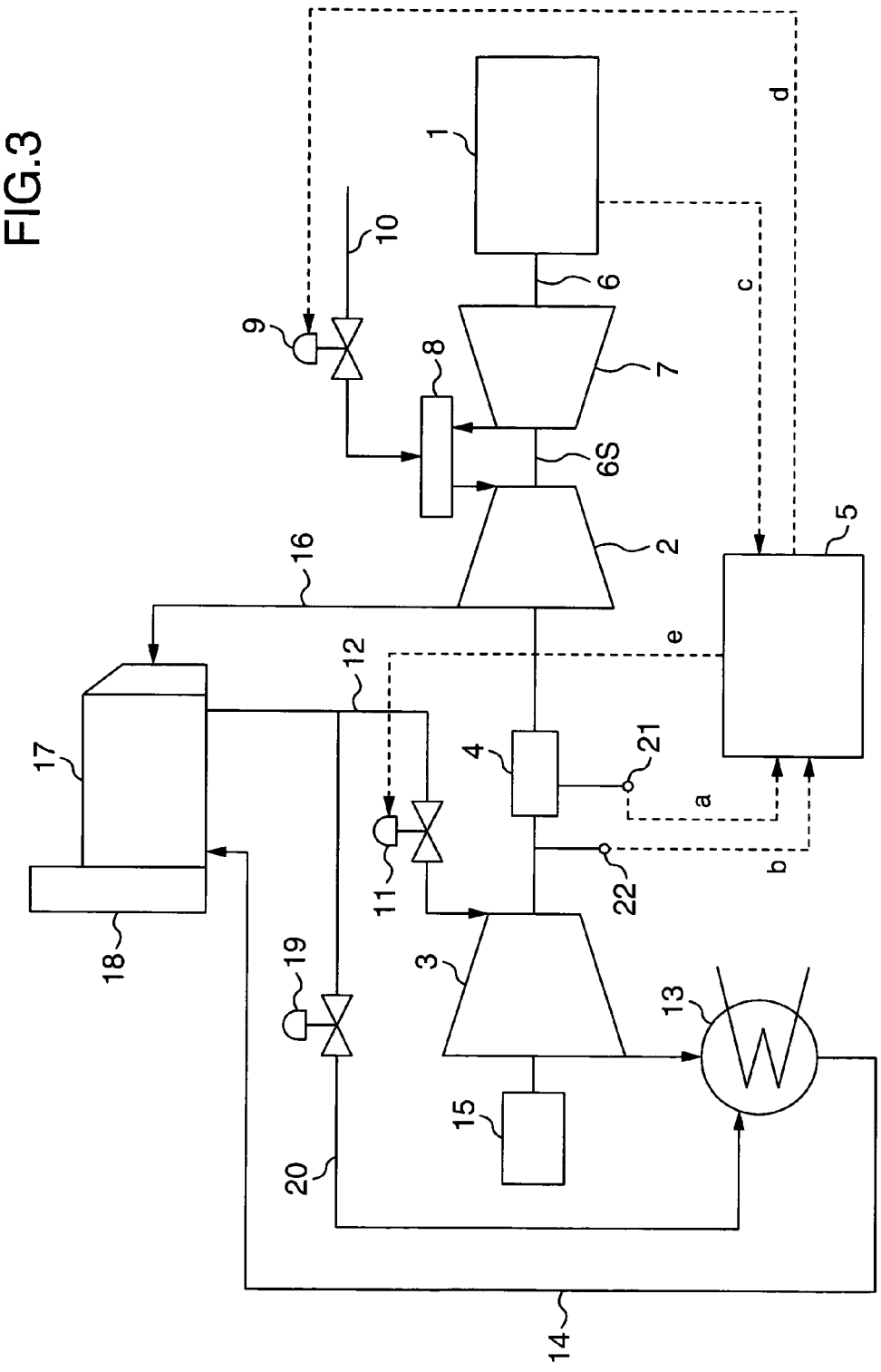
FIG. 3 is a schematic view of a second embodiment of the single shaft combined cycle power plant according to the invention.

In the above described embodiment, although the steam turbine 3 is separated from and connected to the generator 1 connected to the gas turbine 2, the invention is not limited to this. Specifically, as shown in a second embodiment in FIG. 3, the steam turbine 3 may be separated from and connected to the gas turbine 2 connected to the generator 1, whereby the same operational advantage as the first embodiment can be obtained.

In the above embodiments, although the clutch connection detector 21, the rotation speed detector 22, the control device 5, and the steam regulating valve 11 are described as a means for maintaining the rotation speed of the steam turbine 3 at the speed slower than but near the rated rotation speed, it may be possible to provide the turning device 15 or other rotation devices as a means for maintaining the rotation speed at a speed slower than but near the rated rotation speed. In this case, the control device 5 having received the detection signals "a" and "b" from the clutch connection detector 21 and the rotation speed detector 22 should indicate an appropriate rotation speed for the turning device 15 and other rotation devices during the standby state.

As described above, according to the invention, there is provided a single shaft combined cycle power plant which can quickly switch from single operation of a gas turbine to combined operation of the gas turbine and a steam turbine, and can quickly increase output power, from low power to high power.

It should be further understood by those skilled in the art that although the foregoing description has been made on the embodiments of the invention, the invention is not limited thereto and various changes and modifications may be made without departing from the spirit of the invention and the scope of the appended claims.

What is claimed is:

1. A method of operating a single shaft combined cycle power plant, including the steps of:
   driving a generator by a gas turbine and a steam turbine; and
   separating the steam turbine from a coupled unit of the generator and the gas turbine according to a load of the generator to drive the generator by the gas turbine solely, wherein
   the method further includes the steps of:
   when the load of the generator decreases, reducing the rotation speed of the steam turbine below a rated rotation speed, separating the steam turbine from the coupled unit of the generator and the gas turbine, and maintaining the rotation speed of the steam turbine at a speed corresponding to that at the time of separating the connection; and
   when the load of the generator increases, increasing the rotation speed of the steam turbine to the rated rotation speed and connecting the steam turbine to the coupled unit of the generator and the gas turbine.

2. A method of operating a single shaft combined cycle power plant, including the steps of:
   driving a generator by a gas turbine and a steam turbine; and
   separating or connecting the steam turbine from or to a coupled unit of the generator and the gas turbine according to a load of the generator to perform single operation of the gas turbine or combined operation of the steam turbine and the gas turbine, wherein
   the method further includes the steps of:
   when performing the single operation of the gas turbine, limiting the amount of steam supplied to the steam turbine to reduce the rotation speed of the steam turbine below a rated rotation speed, separating the steam turbine from the coupled unit of the generator and the gas turbine, and maintaining the rotation speed of the steam turbine at a speed corresponding to that at the time of separating the connection; and
   when performing the combined operation of the steam turbine and the gas turbine, increasing the amount of steam supplied to the steam turbine to increase the rotation speed of the steam turbine to the rated rotation speed, and connecting the steam turbine to the coupled unit of the generator and the gas turbine.

3. A method of operating a single shaft combined cycle power plant, including the steps of:
   driving a generator by a gas turbine and a steam turbine; and
   separating the steam turbine from a coupled unit of the generator and the gas turbine according to a load of the generator to drive the generator by the gas turbine solely, wherein
   the method further includes the step of:
   increasing or reducing the amount of steam supplied to the steam turbine according to the load of the generator to increase or reduce the rotation speed of the steam turbine up to a rated rotation speed, or below the rated rotation speed, thereby connecting or separating the steam turbine to or from the coupled unit of the generator and the gas turbine.

4. A method of operating a single shaft combined cycle power plant, including the steps of:
   driving a generator by a gas turbine and a steam turbine; and
   separating or connecting the steam turbine from or to a coupled unit of the generator and the gas turbine according to a load of the generator to perform single operation of the gas turbine or combined operation of the steam turbine and the gas turbine, wherein
   the method further includes the steps of:
   when solely operating the gas turbine during the load frequently changes, limiting the amount of steam supplied to the steam turbine to reduce the rotation speed of the steam turbine below a rated rotation speed, separating the steam turbine from the coupled unit of the generator and the gas turbine, and maintaining the rotation speed of the separated steam turbine at a predetermined speed slower and near the rated rotation speed; and
   when the operation is changed from the single operation of the gas turbine to the combined operation of the steam turbine and the gas turbine, increasing the amount of steam supplied to the steam turbine to increase the rotation speed of the steam turbine up to the rated rotation speed, and connecting the steam turbine to the coupled unit of the generator and the gas turbine.

5. A method of operating a single shaft combined cycle power plant, including the steps of:
   driving a generator by a gas turbine and a steam turbine; and
   separating or connecting the steam turbine from or to a coupled unit of the generator and the gas turbine according to a load of the generator to perform single operation of the gas turbine or combined operation of the steam turbine and the gas turbine, wherein
   in the case of operating the single shaft combined cycle power plant in a time zone with load change and in a time zone with no load change, the method further comprises the steps of:
   (I) if the load of the generator decreases in the time zone with no load change, stopping rotation of the steam turbine or rotating the steam turbine at a low speed while the steam turbine is separated from the coupled unit of the generator and the gas turbine, to perform the single operation of the gas turbine;
   (II) if the time zone with load change is just around the corner, supplying steam to the steam turbine to maintain the rotation speed of the steam turbine at a speed slower than and near a rated rotation speed;

(III) if the load of the generator increases in the time zone with load change, increasing the amount of steam supplied to the steam turbine to increase the rotation speed of the steam turbine up to the rated rotation speed, and connecting the steam turbine to the coupled unit of the generator and the gas turbine to perform the combined operation; and (IV) if the load of the generator decreases in the time zone with the load change, limiting the amount of steam supplied to the steam turbine to reduce the rotation speed of the steam turbine below the rated rotation speed, separating the steam turbine from the coupled unit of the generator and the gas turbine to perform the single operation of the gas turbine, and maintaining the rotation speed of the separated steam turbine at a speed near the rated rotation speed.

* * * * *